United States Patent Office 3,611,759
Patented Oct. 12, 1971

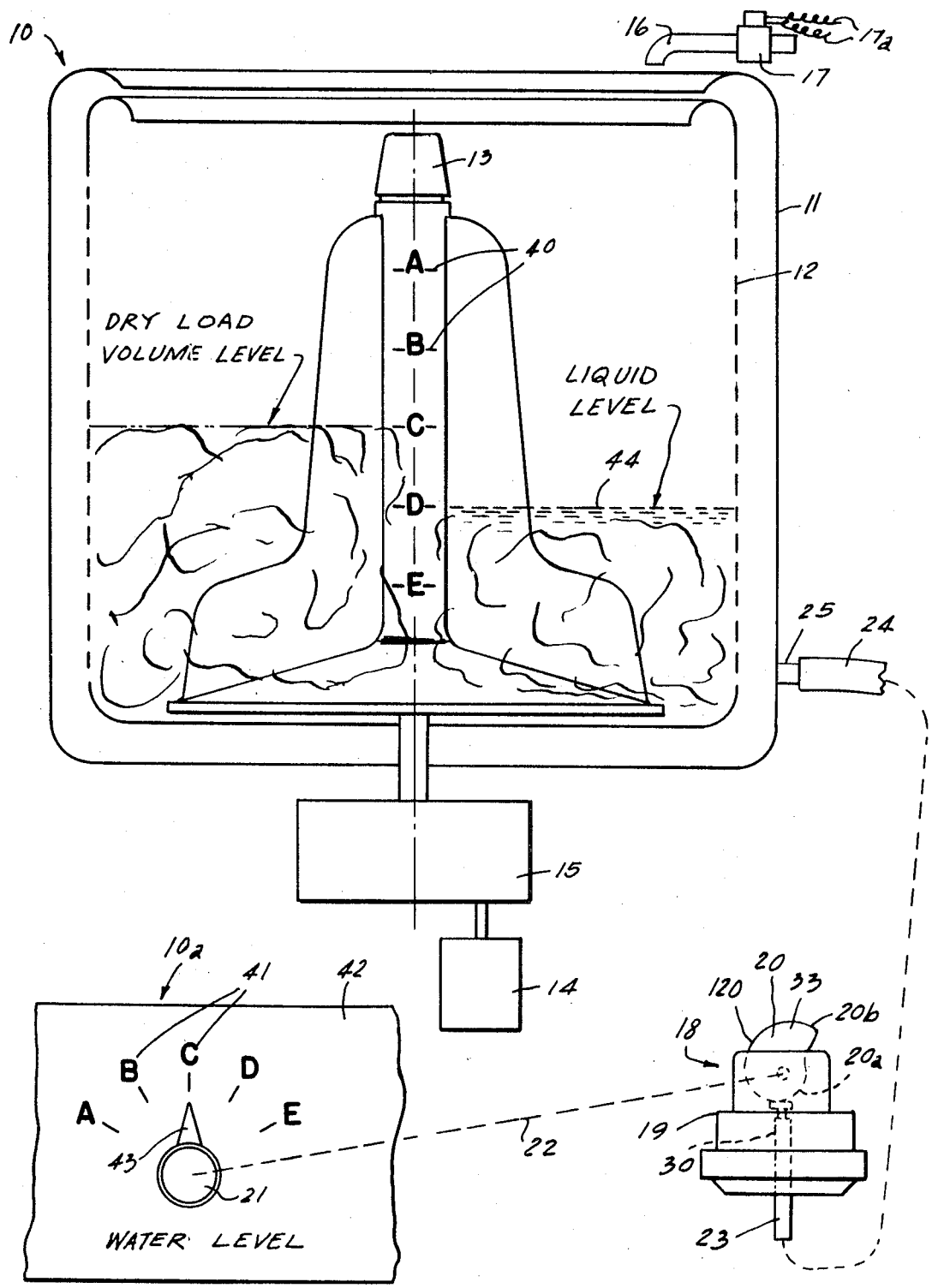

3,611,759
WATER LEVEL CONTROL FOR AUTOMATIC
WASHING MACHINE
Donald E. Janke, Benton Harbor, Mich., assignor to
Whirlpool Corporation, Benton Harbor, Mich.
Filed Mar. 18, 1970, Ser. No. 20,552
Int. Cl. D06f 39/08
U.S. Cl. 68—207          6 Claims

ABSTRACT OF THE DISCLOSURE

A method of predetermining an optimum water level in an automatic washing machine as a function of the dry volume of a load of material to be laundered. To facilitate performing the method, an upright vertical portion of the treatment zone, for example, the agitator of the washing machine, is calibrated to identify known volumetric capacities of the treatment zone. Corresponding indicia at different vertical levels are provided to measure the dry load volume of a batch of material to be laundered. A water level selector switch having indicia correspondingly correlated to the indicated dry load level is then preset to admit into the treatment zone a predetermined quantum of laundry liquid matched to the dry volume of material to be laundered.

BACKGROUND OF THE INVENTION

Field of the invention

The present invention is directed to an automatic washing machine and more specifically to a method and apparatus for determining the optimum level of laundry liquid to be used as a function of the dry volume of the load being laundered.

Prior art

In laundry machines such as automatic washing machines which perform various laundry operation in sequence including washing, rinsing and extracting, the washing fluid and rinsing fluid is usually introduced in metered quantities. There has been a long-standing need for obtaining a correct water level and amount of water in a washing machine for the size and characteristics of the load of materials being laundered. Such correct water level is desirable from a standpoint of saving water and for the purpose of providing an efficient washing action of the batch of materials being laundered.

While the provision of a presettable water level control device enables the operator to make a selection of the amount of liquid used during a washing operation, there is usually no guide or means present to aid the operator in exercising proper judgement underlying the proper selection of the quantity of liquid. Accordingly, human judgment errors oftentimes result in improper correlation of water level to the laundry load. Thus, the selected level chosen by the operator may be inadequate for a proper cleansing action or may provide an excessive quantity of water and thus be wasteful.

Means have been provided heretofore to adjust water level control as a function of clothes load weight. However, weighing systems on automatic laundry machines require special linkages which increase the cost of the machine. Further, weight is not always a proper criterion for determining the amount of water necessary for effecting a proper cleansing during a washing operation.

SUMMARY OF THE INVENTION

An important criterion of washability is the agitation of materials being laundered in the presence of an optimum supply of laundry liquid. I have discovered that the dry load volume of the materials being laundered is one of the major factors which determine the optimum amount of laundry liquid, and that the optimum amount of liquid is directly related to the dry load volume. Thus, whether the load constitutes delicate fabric such as lingerie or heavy work clothing such as denim material or bulky material such as terry cloth toweling, the dry volume of the prospective load will constitute a reliable controlling variable in determining the optimum quantity of liquid for laundering such material. Since the volume of a vertical axis washing machine treatment zone is principally determined by the cross sectional area of the basket or container and its vertical height, such factors can be advantageously exploited to measure the dry load volume of clothes to be laundered.

The present invention is directed to a method and an automatic washing machine having means for practicing the method in which the dry volume of a load of wash is used to determine the proper water level and the amount of water for a proper laundering action. Preferably, the volume is determined by the use of a gauge consisting of a scale of vertically spaced indicia which will indicate the height, and hence the volume, of the dry load of material charged into the basket or container of the washing machine. For convenience, such a gauge or volume scale can be disposed in a visible location, for example, on the upright center post or agitator of a vertical axis machine.

A water level selector switch has indicia correspondingly correlated to the indicated dry load level. Thus, the operator presettably adjusts the selector switch as a function of the indicated dry load level, whereupon a quantity of the liquid will be supplied to the treatment zone which is directly related to the dry load volume of the materials to be laundered.

BRIEF DESCRIPTION OF THE DRAWINGS

The single figure of the drawing is a somewhat schematic view of a vertical axis automatic washer embodying the invention and capable of practicing the methods disclosed herein.

DESCRIPTION OF THE PREFERRED EMBODIMENT

Although the principles of the present invention are useful in any washing machine having a variable water level control, a particularly useful application is found in an automatic washing machine generally indicated at 10 in the single figure of the drawing. The washing machine 10, which is schematically illustrated, is a so-called vertical axis automatic washer. Washers of this type may have agitator means therein such as a center post agitator and may constitute either a perforate basket-type or an overflow rinse-type machine. In the illustrative embodiment of the present disclosure, a tub 11 has disposed therein a perforate rotatable spin basket or container 12. A centrally mounted or center post-type agitator 13 is provided which may be driven in an oscillatory manner by means of a motor 14 connecting through a gear box or transmission shown at 15. A water inlet conduit is shown at 16 and supplies liquid for employment as a laundry liquid to the tub 11 under the control of the solenoid operated valve 17. Conductor wires 17a lead to a presettable sequential control means which operate the machine automatically through a sequence of washing and drying steps of a scheduled program.

In accordance with this invention, the washing machine 10 includes an adjustable water level control means. A pressure responsive switch assembly 18 has a switch 19 and an actuator cam 20 linked to a presettable manually operable knob 21 operable as a dial type adjustment means and conveniently located on an accessible portion of a control panel 10a of the washing machine. The cam and the knob are linked by any suitable mechanical linkage, indicated schematically on the drawing by a connection 22.

In order to provide a pressure sense for the controller, the switch assembly 18 has an inlet 23 connected by means of a conduit 24 such as a flexible hose to an opening 25 in the side of the tub 11. The opening 25 is preferably located below the lowest contemplated liquid level to be utilized in the tub 11. As the liquid level in the tub 11 rises, air in the conduit 24 is compressed and enters a chamber where it acts upon a flexible diaphragm in a manner well known in the art. Accordingly, the details of the controller are not necessary to a proper understanding of the present invention and can be varied as a matter of engineering choice. In order to achieve water level selection, it will be appreciated that the movable portions of the controller are subjected to varying pressures by engagement with appropriate presettable means including a cam 20. Thus, the relative position of a plunger 30 within the switch assembly 18 and hence the amount of loading acting against the movable portions of the assembly including the diaphragm is determined by the relative angular position of the cam 20. Such adjustment varies from a low point 20a on the cam action surface indicated at 120 to a high point 20b on a lobe 33 at which maximum adjustment by the cam is effected. The angular position of the cam relative to the post 30 is determined by the corresponding angular position of the control knob or dial 21 on the control panel 10a of the machine 10.

Further, in accordance with this invention, the volume of the dry load material to be laundered is used as the controlling variable for selecting an optimum liquid level in the treatment zone of the washer. Thus, vertically spaced indicia 40 are provided in a visible location such as on the agitator 13 to form a gauge or scale which gauges and indicates the volume of the dry load when placed in the basket or container 12. Preferably, the scale 40 has a plurality of vertically spaced indicia herein illustrated as consisting of a series of letter characters disposed in a lineal vertical row and including A, B, C, D and E. The indicia characters may be embossed in or on the surface of the center post agitator 13. Thus, the indicia of the scale 40 constitute lineal dry load volume level units. Since the effective volume of the treatment zone occupied by the dry materials is, in effect, a function of the available cross sectional area of the basket or container 12 and the height thereof, the vertical scale or gauge 40 provides a direct measure of the dry load volume. Accordingly, a bulky load of terry cloth bath towels can be expected to occupy a much larger volume than a batch of delicate fabrics such as lady's lingerie, when such different materials are considered in terms of the usual criterion of measuring a batch load. In a dry state, different materials entrain different amounts of air and exhibit characteristics of density which differ from those characteristics when the same batch of materials is thoroughly wet. The scale 40 functions as a gauge means and effectively gauges the dry load volume in the treatment zone regardless of the type of material being laundered.

By the present invention, the water level selected is directly correlated with the dry load volume of the materials to be laundered. Thus, the controller 18 has a scale 41 which is correlated to the scale 40 in that there is a corresponding indicia indicator A, B, C, D, E matched to the indicia indicators on the scale 40. The pointer 43 is conveniently placed on a dial 42 on the control panel 10a of the washing machine 10 so that the operator may conveniently gain access thereto for presetting the angular position of the knob or dial 21 to correspond with the indicated dry load volume of the materials in the basket. By so adjusting the knob 21, the cam 20 is likewise positioned in such angular position as to be correlated with the lineal load level corresponding to the dry load volume of the materials being laundered. The step of matching is, in effect, a conversion of the lineal dry load volume level units into indicated liquid quantum units. By properly adjusting the angular position of the cam 20 and by matching the knob or dial 21 to an appropriate indicator on the scale 41, a correct water level is provided for the dry volume gauged by the scale on the center post or agitator 13. For example, as shown on the drawing, there is a volume of dry materials on the lefthand side of the basket. The volume of such materials rises to a level such that an indicated level is readily identified to the operator. Without any need for interpretation, computation or other mental steps, the operator merely presets the knob 21 to a point on the scale 41 corresponding to the observed level on the scale 40.

As shown on the drawing, the level of liquid supplied is not necessarily the same physical level as the dry load level, but is a function of the dry load volume. The actual relationship between the dry load volume and the optimum level of laundry liquid is dependent upon the physical characteristics of the washing machine, such as the type of agitation and the dimensions of the agitator and basket. Thus, the actual quantum of liquid supplied as an optimum amount for washing a batch of mterials having a vertical dry lod volume level shown by the legend "Dry Load Volume Level" may be appreciably less, or more, as the case may be. For example, as shown on the righthand side of the drawing, the "Liquid Level" for the particular batch of clothes shown by legend is less than the illustrative "Dry Load Volume Level."

In operation, the operator first charges the container or basket 12 with a batch of dry material and spreads it out so that the upper surface is substantially level, thereby filling the treatment zone to a given level which is proportionate to the dry load volume. Observing the height of the dry material, the operator then presets the knob or dial 21 so that the scale 41 matches the scale 40. A quantum of liquid is charged into the treatment zone which is optimal for laundering the given batch of material. Thus, a combined wet load level of material and liquid is provided so that the preselected water level which is optimal for the given load is automatically supplied.

Although minor modifications might be suggested by those versed in the art, I wish to embody within the scope of the patent warrented hereon all such modifications as properly come within the scope of my contribution to the art.

The embodiments of the invention in which an exclusive property or privilege is claimed are defined as follows:

1. In a laundry appliance, means forming a treatment zone into which batches of materials to be laundered and liquid are selectively charged successively,
   gauge means for indicating the dry load volume initially charged into said treatment zone,
   and liquid supply selection means for subsequently charging liquid in the said treatment zone having pre-selectable means for matching the quantum of liquid charged into the treatment zone as a function of the dry load volume,
   whereby a combined wet load level of material and liquid is provided which is optimal for laundering the given batch of materials.

2. In a laundry appliance as defined in claim 1, said means forming a treatment zone comprising a tub, a container in said tub rotatable on a vertical axis and said gauge means comprising a vertical lineal scale for indicating the dry load volume initially charged in said container.

3. In a laundry appliance as defined in claim 1, said liquid supply selector means comprising an angularly adjustable dial having positions of angular adjustment matched to the corresponding gauge positions of said gauge means whereby the quantum of liquid charged into the treatment zone constitutes a direct function of the dry load volume.

4. In a laundry appliance as defined in claim 3, said container comprising a perforate basket.

5. In a laundry appliance as defined in claim 3, said liquid supply selector means comprising a pressure sensitive switch and angularly adjustable cam means for varying the operation of the switch.

6. In a laundry appliance as defined in claim 1, said gauge means comprising a center post agitator means having a scale formed on said agitator and comprising a row of vertically spaced indicia for indicating the dry load volume initially charged into the treatment zone of the appliance.

References Cited
UNITED STATES PATENTS

| | | | |
|---|---|---|---|
| 2,656,236 | 10/1953 | Wasemann | 68—13 R X |
| 3,102,551 | 9/1963 | Ziegler | 68—13 R X |
| 3,301,022 | 1/1967 | Low | 68—207 X |
| 3,498,091 | 3/1970 | Mason | 68—207 |

WILLIAM I. PRICE, Primary Examiner

U.S. Cl. X.R.

68—13 R